(12) United States Patent
Yamada et al.

(10) Patent No.: US 8,162,488 B2
(45) Date of Patent: Apr. 24, 2012

(54) PROJECTION DISPLAY APPARATUS

(75) Inventors: Akihiro Yamada, Tokyo (JP); Akira Daijogo, Tokyo (JP); Motoo Takahashi, Tokyo (JP); Kenji Samejima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 12/504,318

(22) Filed: Jul. 16, 2009

(65) Prior Publication Data

US 2010/0045944 A1 Feb. 25, 2010

(30) Foreign Application Priority Data

Aug. 20, 2008 (JP) ................................. 2008-211574

(51) Int. Cl.
*G03B 21/14* (2006.01)

(52) U.S. Cl. ................ 353/97; 353/88; 353/89; 353/90; 353/93; 353/38; 353/31

(58) Field of Classification Search .................... 353/88, 353/89, 90, 91, 9, 93, 38, 31, 97; 349/5, 349/7, 9; 359/233, 234, 236; 362/283, 284, 362/321

See application file for complete search history.

(56) References Cited

U.S. PATENT DOCUMENTS

| | | | |
|---|---|---|---|
| 5,743,612 A * | 4/1998 | Matsuda et al. | 353/97 |
| 6,042,237 A * | 3/2000 | De Vaan et al. | 353/38 |
| 6,728,020 B2 * | 4/2004 | Akitaka | 359/256 |
| 6,769,777 B1 | 8/2004 | Dubin et al. | |
| 6,923,546 B2 * | 8/2005 | Kurematsu | 353/97 |
| 7,185,990 B2 | 3/2007 | Koga et al. | |
| 7,210,795 B2 * | 5/2007 | Hara et al | 353/88 |
| 7,753,535 B2 * | 7/2010 | Shimizu et al. | 353/97 |
| 7,798,653 B2 * | 9/2010 | Inui et al. | 353/97 |
| 7,866,829 B2 * | 1/2011 | Takeuchi et al. | 353/88 |
| 2001/0015775 A1 | 8/2001 | Yamamoto et al. | |
| 2005/0030749 A1 | 2/2005 | Nishida et al. | |
| 2005/0219474 A1 | 10/2005 | Hara et al. | |
| 2005/0264770 A1 * | 12/2005 | Hara et al. | 353/97 |
| 2006/0050248 A1 | 3/2006 | Koga et al. | |
| 2007/0064198 A1 * | 3/2007 | Yoshimura | 353/20 |
| 2007/0064203 A1 * | 3/2007 | Sawai | 353/97 |
| 2008/0043312 A1 | 2/2008 | Yamada et al. | |
| 2008/0304022 A1 | 12/2008 | Yamada et al. | |
| 2008/0316569 A1 * | 12/2008 | Chen et al. | 359/237 |

FOREIGN PATENT DOCUMENTS

EP 1 890 189 2/2008

(Continued)

*Primary Examiner* — William C Dowling
*Assistant Examiner* — Sultan Chowdhury
(74) *Attorney, Agent, or Firm* — Birch, Stewart, Kolasch & Birch, LLP.

(57) ABSTRACT

A projection display apparatus includes a light valve, a light source for producing light directed to the light valve, an integrator lens disposed in an optical path extending from the light source to the light valve and including a first lens array and a second lens array, and a light amount adjustment mechanism disposed in the optical path between the first lens array and the second lens array. The light amount adjusting mechanism includes a pair of light shielding elements pivoting in the form of a pair of double doors. The pair of light shielding elements have an opening formed in a region of tip portions thereof which corresponds to lens cells in contact with the optical axis of the second lens array. A region of the opening corresponding to one lens cell in contact with the optical axis of the second lens array is of a triangular configuration.

4 Claims, 16 Drawing Sheets

FOREIGN PATENT DOCUMENTS

| | | |
|---|---|---|
| JP | 2005-31103 A | 2/2005 |
| JP | 2006-308787 | 11/2006 |
| JP | 2008-46468 A | 2/2008 |
| JP | 2008-96629 A | 4/2008 |
| WO | WO-2005/026835 A1 | 3/2005 |

* cited by examiner

F I G . 1
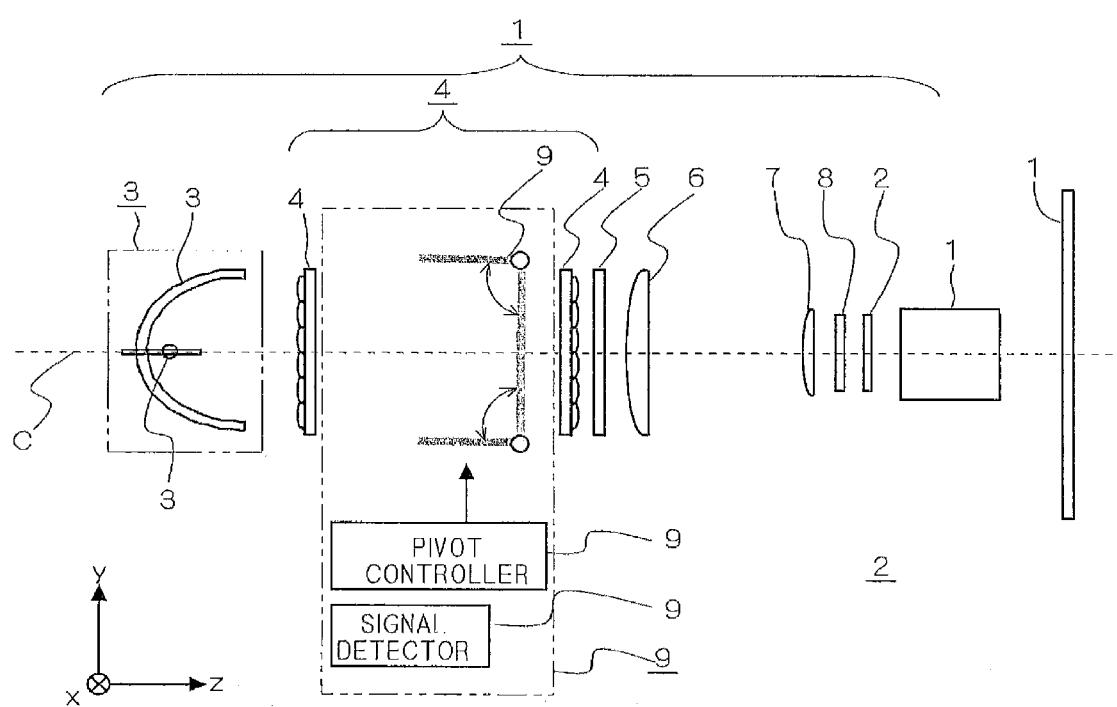

FIG. 8
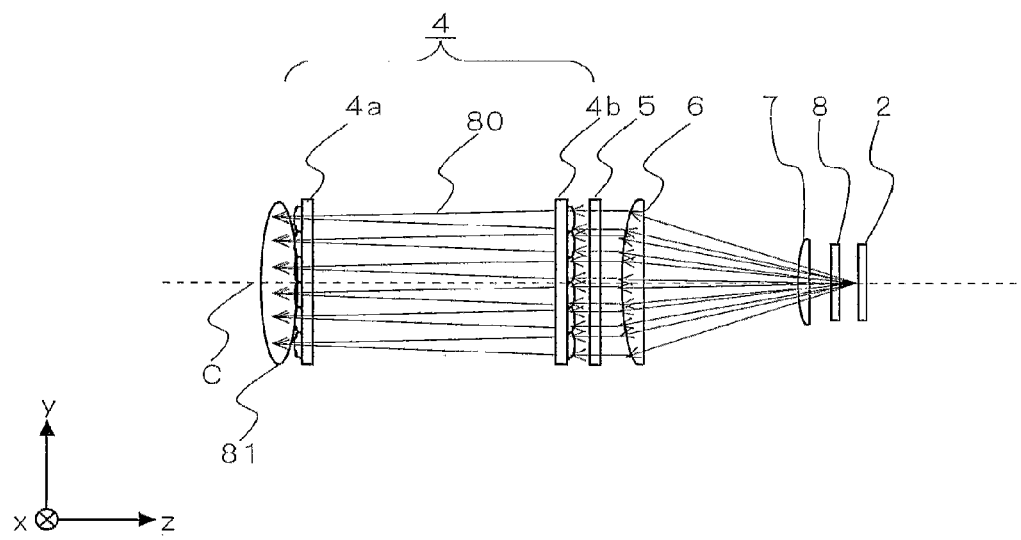
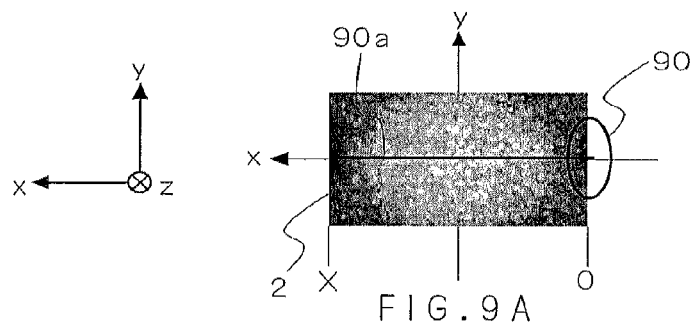
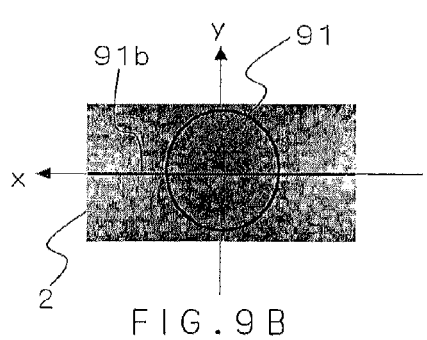
FIG.9B
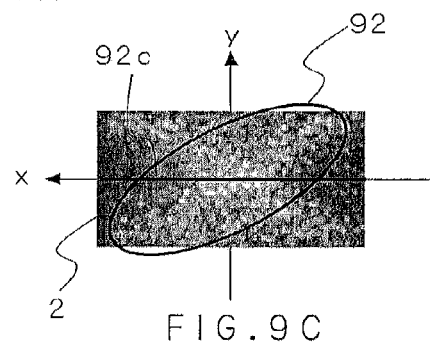
FIG.9C

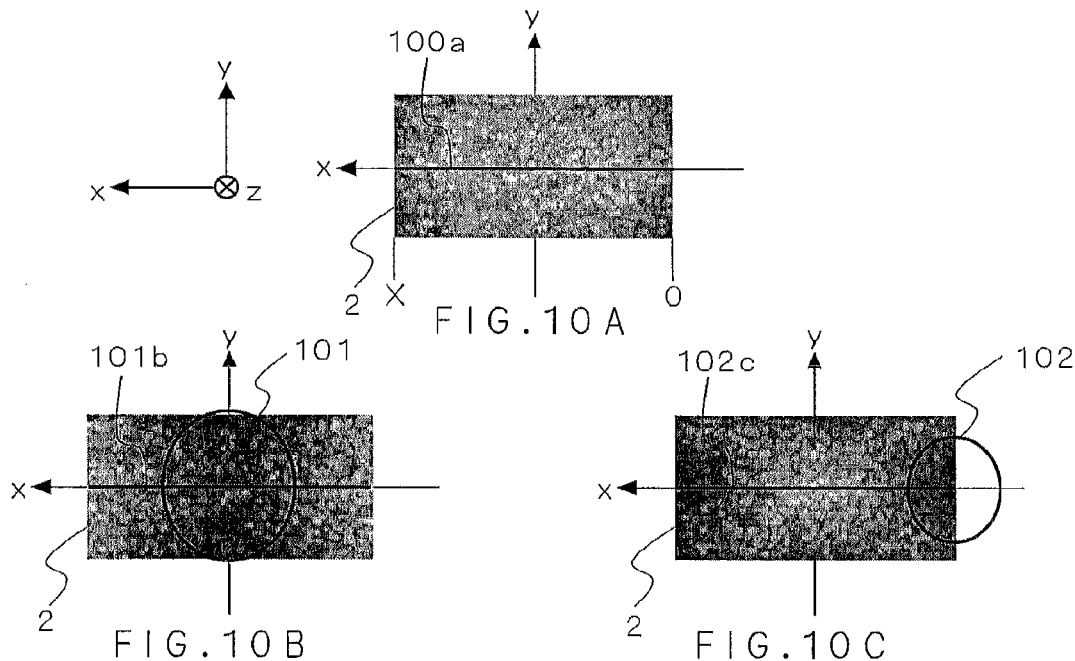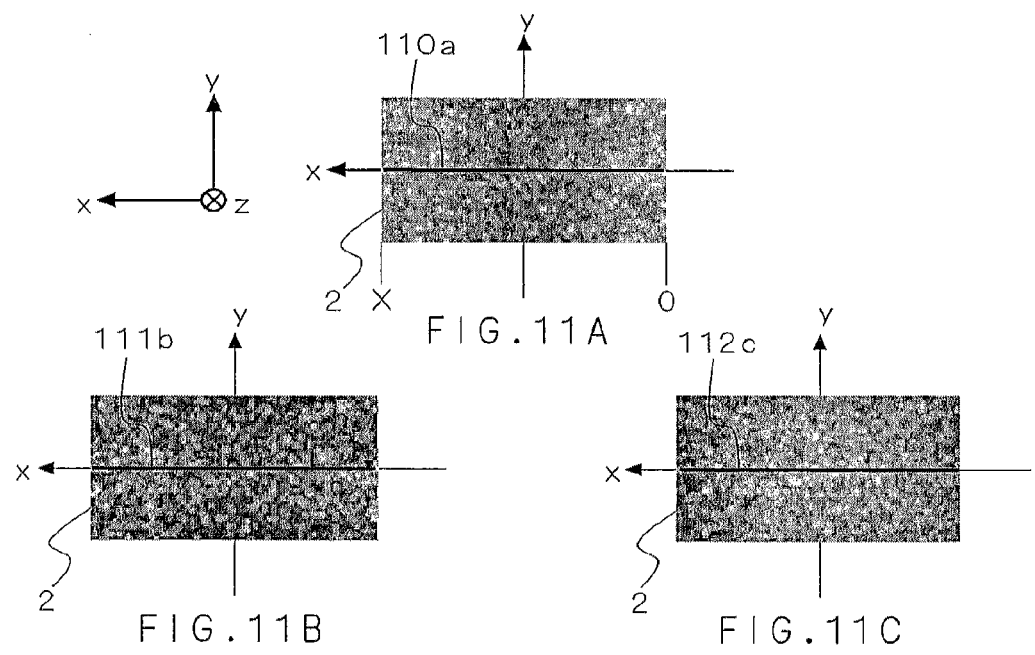

F I G . 1 7 A
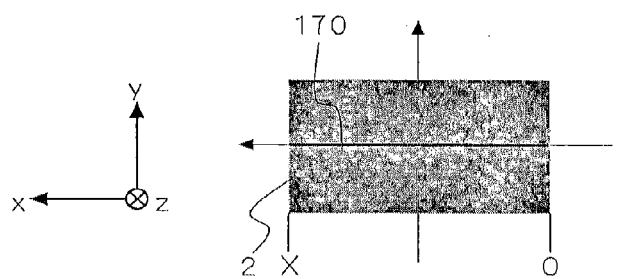
F I G . 1 7 B
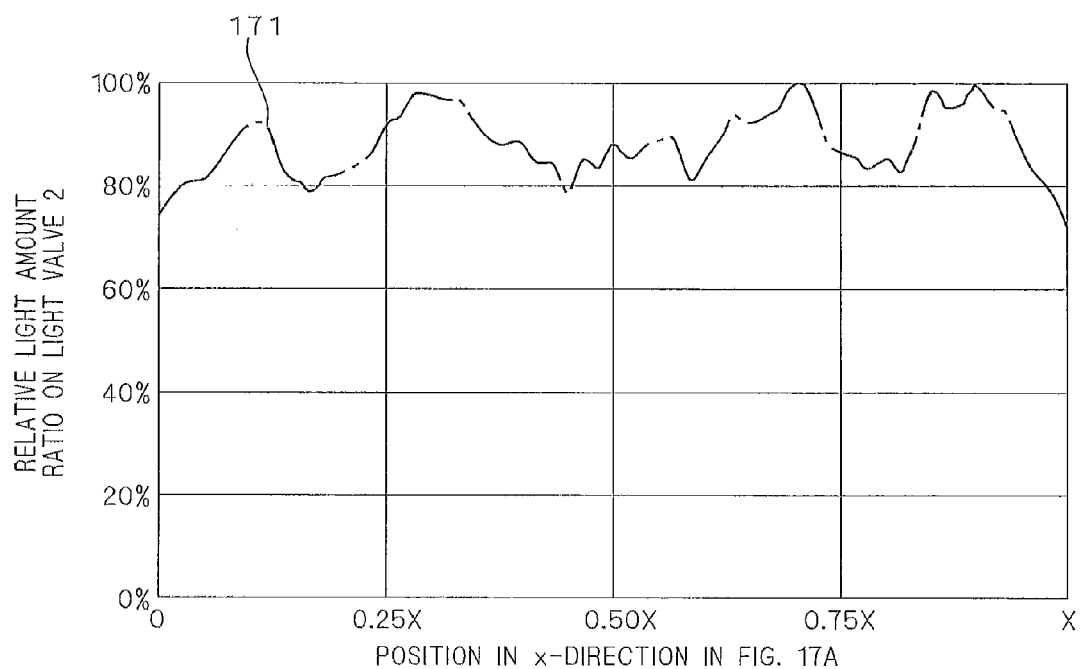

PROJECTION DISPLAY APPARATUS

BACKGROUND OF THE INVENTION

1. Field of the Invention

The present invention relates to a projection display apparatus and, more particularly, to a projection display apparatus including a light amount adjustment mechanism.

2. Description of the Background Art

In recent years, a projection display apparatus has been developed as one type of image display apparatus, and put to practical use. With conventional projection display apparatuses, light leaks and stray light (unwanted light) have occurred in a variety of optical elements constituting optical systems such as induction optical systems, projection lenses and the like. In particular, when images are projected onto a screen in a dark room, a dark image does not sufficiently appear dark. This has presented a problem such that insufficient contrast results in the lack of a sense of realism. In particular, a projection display apparatus using a liquid crystal light valve is not capable of completely cutting off transmitted light because the liquid crystal light valve has the characteristic of cutting off the transmitted light in accordance with the polarization property of the light, and has limitations in meeting the requirement by video signal processing. Thus, there is a strong demand for improving the contrast in the projection display apparatus using the liquid crystal light valve.

To solve the problem as mentioned above, a projection display apparatus as disclosed in, for example, International Publication No. WO 2005/026835 (Page 51, FIG. 6) has been devised. This projection display apparatus includes, for example, a light shielding plate disposed between a first lens array and a second lens array for the purpose of improving the contrast of images projected onto a screen and the like, and causes the light shielding plate of a planar configuration to pivot in response to a video signal, thereby controlling the amount of light directed to a light valve in accordance with the video signal.

In the projection display apparatus including a conventional light amount adjustment mechanism as mentioned above, however, some light reaches lens cells of the second lens array other than lens cells thereof which are in contact with an optical axis C when the maximum amount of light exiting from the first lens array is cut off. Thus, there has been a problem such that the conventional projection display apparatus finds difficulties in providing high contrast.

SUMMARY OF THE INVENTION

It is an object of the present invention to provide a projection display apparatus which facilitates the continuous adjustment of the amount of light without the occurrence of unevenness in illuminance of light directed to a light valve and which is capable of constantly displaying images with sufficient contrast.

According to the present invention, a projection display apparatus includes a light valve, a light source, an integrator lens, and a light amount adjustment mechanism. The light source produces light directed to the light valve. The integrator lens is disposed in an optical path extending from the light source to the light valve, and includes a first lens array and a second lens array both for rendering even an illuminance distribution of light directed from the light source. The light amount adjustment mechanism is disposed in the optical path between the first lens array and the second lens array, and adjusts the amount of light directed to the light valve. The light amount adjusting mechanism includes a pair of light shielding elements pivoting in the form of a pair of double doors. The pair of light shielding elements have an opening formed in a region of tip portions thereof which corresponds to lens cells in contact with the optical axis of the second lens array. A region of the opening corresponding to one lens cell in contact with the optical axis of the second lens array is of a triangular configuration.

Only lens cells of the second lens array reached by a small amount of light allow light emitted from the light source to pass through. This increases the maximum amount of light interception during the adjustment of the amount of light to decrease the amount of light reaching the light valve, as compared with an instance in which light are caused to reach other lens cells.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing the construction of an illumination optical system in a projection display apparatus using a liquid crystal light valve according to a first preferred embodiment of the present invention;

FIG. 8 is a view showing ray trajectories when reverse ray tracing is carried out from the center of the light valve in the projection display apparatus;

FIGS. 9A to 9C show illuminance distributions on the light valve when the light shielding elements in the projection display apparatus are placed in a location 1 according to the first preferred embodiment of the present invention;

FIGS. 10A to 10C show illuminance distributions on the light valve when the light shielding elements in the projection display apparatus are placed in a location m according to the first preferred embodiment of the present invention;

FIGS. 11A to 11C show illuminance distributions on the light valve when the light shielding elements in the projection display apparatus are placed in a location n according to the first preferred embodiment of the present invention;

FIGS. 17A and 17B show an illuminance distribution and a relative light amount ratio on the light valve in the projection display apparatus according to the first preferred embodiment of the present invention;

DESCRIPTION OF THE PREFERRED EMBODIMENTS

First Preferred Embodiment

Figure 2:
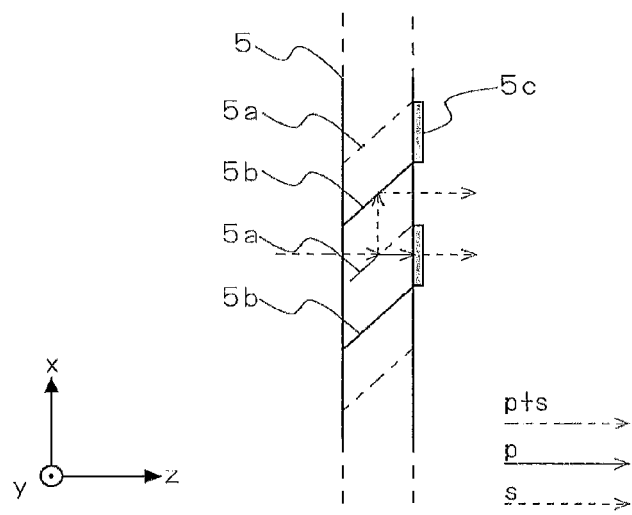
FIG. 2 is a view showing the construction of a polarization conversion element according to the first preferred embodiment of the present invention.

FIG. 1 is a view showing the construction of an illumination optical system 1 in a projection display apparatus 20 using a liquid crystal light valve according to a first preferred embodiment of the present invention. As shown in FIG. 1, the illumination optical system 1 includes a light valve 2, a light source system 3 for directing light to the light valve 2, an integrator lens 4 disposed in a path of light extending from the light source system 3 to the light valve 2, a polarization conversion element 5 disposed behind the integrator lens 4, a condenser lens 6 disposed behind the polarization conversion element 5, a field lens 7 disposed behind the condenser lens 6, a polarizing sheet 8 disposed behind the field lens 7, and a light amount adjustment system 9 disposed in the path of light.

The projection display apparatus 20 further includes a projection optical system 10 disposed behind the light valve 2, and a screen 11 disposed behind the projection optical system 10. The construction related to the path of light for a single color is shown in FIG. 1. Alternatively, the projection display apparatus 20 may include the components 1 to 9 for each of the three colors: red, green and blue, and further include a light combination element (not shown). In this case, the light combination element combines rays of image light for the respective colors together, and the projection optical system 10 projects the combined light ray onto the screen 11.

Next, the above-mentioned components will be discussed. The light valve 2 used in this preferred embodiment is a liquid crystal light valve. Instead, the light valve 2 may employ a DMD (Digital Micro-Mirror Device) or a reflective liquid crystal display element.

The light source system 3 is provided to direct light to the light valve 2, and includes a light source 3a, and a reflecting mirror 3b for reflecting the light emitted from the light source 3a to direct the reflected light to the integrator lens 4.

In general, examples of the light source 3a used herein include a high pressure mercury lamp, a halogen lamp and a xenon lamp. However, other light emitting devices may be used as the light source 3a. For example, an LED (Light Emitting Diode), a laser, an electrodeless discharge lamp and the like may be used.

The reflecting mirror 3b is of a paraboloidal or ellipsoidal configuration. However, the reflecting mirror 3b may have any configuration and structure if light is collected onto the polarization conversion element 5, and is not particularly limited. As an example, when the light incident on the integrator lens 4 is to be made substantially parallel to an optical axis C, the reflecting mirror 3b of a paraboloidal configuration is used. Alternatively, when the reflecting mirror 3b is of an ellipsoidal configuration, a concave lens may be disposed between the light source system 3 and the integrator lens 4 so as to make the light incident on the integrator lens 4 substantially parallel to the optical axis C (with reference to FIG. 16).

The integrator lens 4 is disposed in the path of light extending between the light source system 3 and the light valve 2, and provides an even illuminance distribution of light directed from the light source system 3 to the light valve 2. The integrator lens 4 includes a first lens array 4a, and a second lens array 4b disposed behind and spaced apart from the first lens array 4a. Each of the first and second lens arrays 4a and 4b includes a plurality of convex lenses (lens cells) arranged in a two-dimensional array. The plurality of convex lenses of the first lens array 4a are in corresponding relation to the plurality of convex lenses of the second lens array 4b, respectively. Corresponding ones of the convex lenses are disposed in back-to-back orientation.

The polarization conversion element 5 converts the light incident on the polarization conversion element 5 into one type of linearly polarized light to emit the linearly polarized light. The polarization conversion element 5 is disposed from the second lens arrays 4b at an appropriate distance in the x-direction. FIG. 2 is a view showing the construction of the polarization conversion element 5 according to the first preferred embodiment of the present invention. As shown in FIG. 2, the polarization conversion element 5 includes a plurality of polarization separation films 5a disposed at an inclination (for example, of 45 degrees) from the optical axis C (extending in the z-direction), a plurality of reflective films 5b disposed at an inclination (for example, of 45 degrees) from the optical axis C (extending in the z-direction) and each disposed between adjacent ones of the polarization separation films 5a, and a plurality of λ/2 phase difference plates 5c lying on a surface of the polarization conversion element 5 which is closer to the light valve 2 and positioned so as to be irradiated with the light having passed through the polarization separation films 5a.

The light entering the polarization conversion element 5 is separated into s-polarized light and p-polarized light by the polarization separation films 5a. The p-polarized light is transmitted through the polarization separation films 5a, and is then converted into the s-polarized light by the λ/2 phase difference plates 5c. Then, the s-polarized light is emitted from the polarization conversion element 5. The s-polarized light, on the other hand, is reflected from the polarization separation films 5a and then from the reflective films 5b, and is thereafter emitted from the polarization conversion element 5. Thus, the light emitted from the polarization conversion element 5 is, for the most part, the s-polarized light. To cause the light emitted from the polarization conversion element 5 to become, for the most part, the p-polarized light, the λ/2 phase difference plates 5c are positioned so as to be irradiated with the s-polarized light reflected from the reflective films 5b, rather than being positioned so as to be irradiated with the p-polarized light transmitted through the polarization separation films 5a.

The light amount adjustment system 9 (a light amount adjustment mechanism) is disposed in the path of light, and adjusts the amount of light directed from the light source system 3 to the light valve 2. The light amount adjustment system 9 includes a pivotal mechanism 9a including a pair of light shielding elements disposed between the first lens array 4a and the second lens array 4b and pivoting in the form of a pair of double doors, a signal detector 9b for detecting a video signal to be inputted to the light valve 2 to calculate a relative light amount ratio of the amount of light to be directed to the light valve 2 from the result of detection, and a pivot controller 9c for controlling the pivotal movement of the pivotal mechanism 9a based on the relative light amount ratio calculated by the signal detector 9b.

Figure 3:
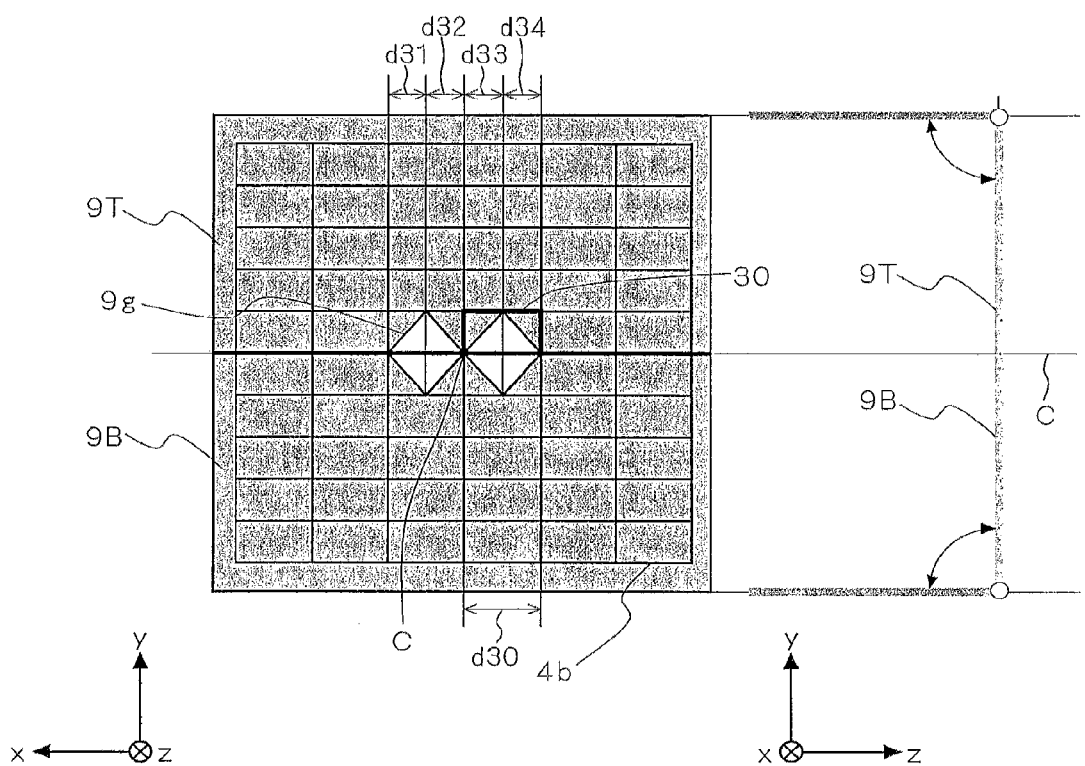
FIG. 3 is a view showing an example of a pivotal mechanism in the projection display apparatus according to the first preferred embodiment of the present invention.

FIG. 3 is a view showing an example of the configuration of the pivotal mechanism 9a in the projection display apparatus according to the first preferred embodiment of the present invention. As shown in FIG. 3, the pivotal mechanism 9a includes light shielding elements 9T and 9B. The tip portions of the respective light shielding elements 9T and 9B are formed with recessed portions 9g (openings) for limiting the passage of light. In this preferred embodiment, the openings are formed in a region of the tip portions of the respective light shielding elements 9T and 9B which corresponds to lens cells in contact with the optical axis of the second lens array 4b. The recessed portions 9g may be of a concavely curved configuration or of a triangular configuration. In this preferred embodiment, a region of the openings corresponding to one lens cell in contact with the optical axis of the second lens array 4b is of a triangular configuration. With reference to FIGS. 1 and 3, the pivotal mechanism 9a pivots the light shielding elements 9T and 9B toward the second lens array 4b to decrease the amount of light, thereby adjusting the amount of light. Instead, the pivotal mechanism 9a may pivot the light shielding elements 9T and 9B toward the first lens array 4a to decrease the amount of light, thereby adjusting the amount of light.

In the projection display apparatus 20 constructed in this manner, a ray of light emitted from the light source 3a which is substantially parallel to the optical axis C enters the first lens array 4a, and is split into a plurality of rays of light corresponding to the respective convex lenses (cells) of the first lens array 4a. The plurality of rays of light pass through the corresponding convex lenses of the second lens array 4b. After passing through the second lens array 4b, the plurality of rays of light are converted for the most part into the s-polarized light by passing through the polarization conversion element 5. Then, by passing through the condenser lens 6, the plurality of rays of s-polarized light are superimposed on the light valve 2 to provide an even illuminance distribution. A principal ray exiting from some of the convex lenses (cells) of the first lens array 4a which are near or in contact with the optical axis C passes through the condenser lens 6, and then becomes a ray of light parallel to the optical axis C again by passing through the field lens 7. The polarizing sheet 8 allows only the s-polarized light subjected to the polarization conversion in the polarization conversion element 5 to pass therethrough. The s-polarized light is directed to the light valve 2. Thus, images generated by the light valve 2 are projected through the projection optical system 10 onto the screen 11.

During the above-mentioned process, the signal detector 9b detects a video signal detects a video signal to be inputted to the light valve 2. Based on the result of detection, the pivotal mechanism 9a is controlled to improve the contrast of the images on the screen 11. Specifically, the light shielding elements 9T and 9B to be described later are brought into operation to adjust (increase or decrease) the amount of light directed to the light valve 2.

Next, the adjustment of contrast will be described. For image display with a video signal having high brightness, light directed toward the second lens array 4b is not intercepted. For image display with a video signal having low brightness, light directed toward the second lens array 4b is intercepted by an amount corresponding to the lowness of the brightness of the video signal. As a specific example, for a high-brightness video signal such that the relative value of the brightness of the video signal is 100%, the pivotal mechanism 9a does not intercept the light directed toward the second lens array 4b (or intercepts 0% of the light) so that the relative light amount ratio of the light directed to the light valve 2 is 100%.

For a video signal having a relative value of brightness of 20%, the pivotal mechanism 9a intercepts 80% of the light directed toward the second lens array 4b so that the relative light amount ratio of the light directed to the light valve 2 is 20%. Such adjustment of the relative light amount ratio enables the adjustment of the brightness of displayed images to be approximately five times finer. Further, the pivotal mechanism 9a intercepts light to decrease the relative light amount ratio. Thus, for a video signal having a relative value of brightness of 0%, the pivotal mechanism 9a intercepts not less than 80% of the light directed toward the second lens array 4b to allow the display of a sufficiently dark image.

In this manner, the improvement of contrast is accomplished by controlling the pivotal mechanism 9a. Since the light valve 2 has generally constant transmittance, the pivotal mechanism 9a is used to decrease the amount of light directed to the light valve 2, thereby providing a dark image to be projected onto the screen 11. A relationship between the relative value of the brightness of the video signal and the relative light amount ratio of the light directed to the light valve 2 is not limited to the above-mentioned relationship, but may be a different relationship established so that the higher the relative value of the brightness of the video signal is, the higher the relative light amount ratio is.

Figure 4:
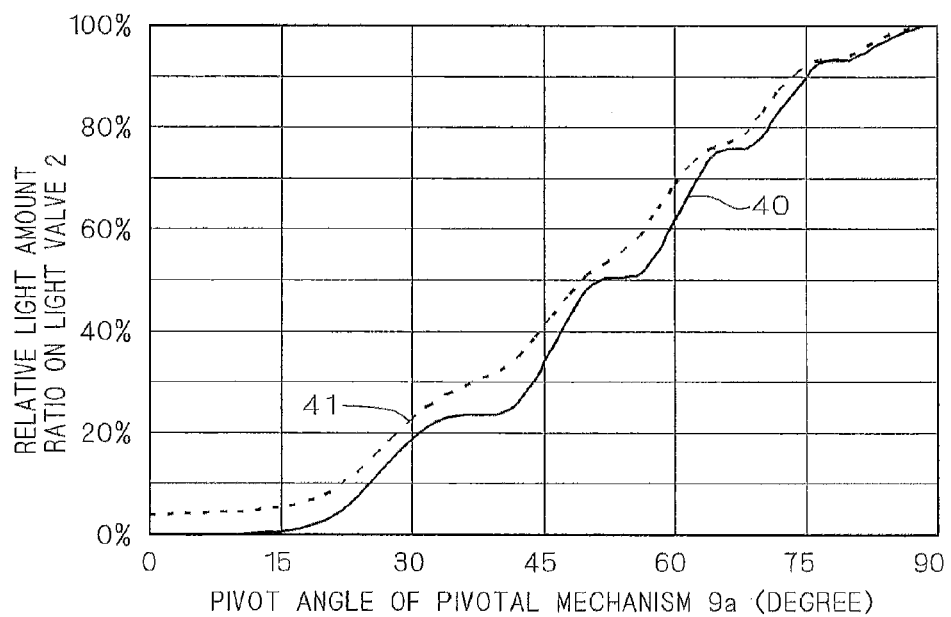
FIG. 4 is a graph showing a relationship between a pivot angle and a relative light amount ratio for the configuration of the pivotal mechanism shown in FIG. 3.

Next, change in the relative light amount ratio on the light valve 2 based on the control of the pivotal mechanism 9a will be described. FIG. 4 is a graph showing a relationship between a pivot angle and the relative light amount ratio for the configuration of the pivotal mechanism shown in FIG. 3. The pivot angle of the pivotal mechanism 9a shall be in steps of 2 degrees. With reference to FIG. 3, a relationship between the length d30 of the long side (extending in the x-direction) of each of the lens cells 30 of the second lens array 4b which are in contact with the optical axis C and distances d31, d32, d33 and d34 is as follows: d31=d32=d33=d34=d30/2. In the following description, an axis perpendicular to the optical axis C and extending in a horizontal direction is defined as an x-axis, and an axis perpendicular to the optical axis C and extending in a vertical direction is defined as a y-axis.

In FIG. 4, a curve 40 represents a relationship between the pivot angle and the relative light amount ratio when the recessed portions 9g are not formed in the light shielding elements 9T and 9B with reference to FIG. 3, that is, when the tip portions of the light shielding elements 9T and 9B are linear in configuration, and a curve 41 represents a relationship between the pivot angle and the relative light amount ratio when the light shielding elements 9T and 9B have the configuration shown in FIG. 3. From FIG. 4, it is found that, while the curve 40 has four flat intervals, the curve 41 is generally smooth as compared with the curve 40 and shows that the amount of light is smoothly adjustable. Therefore, the formation of the recessed portions 9g in the light shielding elements 9T and 9B achieves the smooth adjustment of the amount of light.

Figure 5:
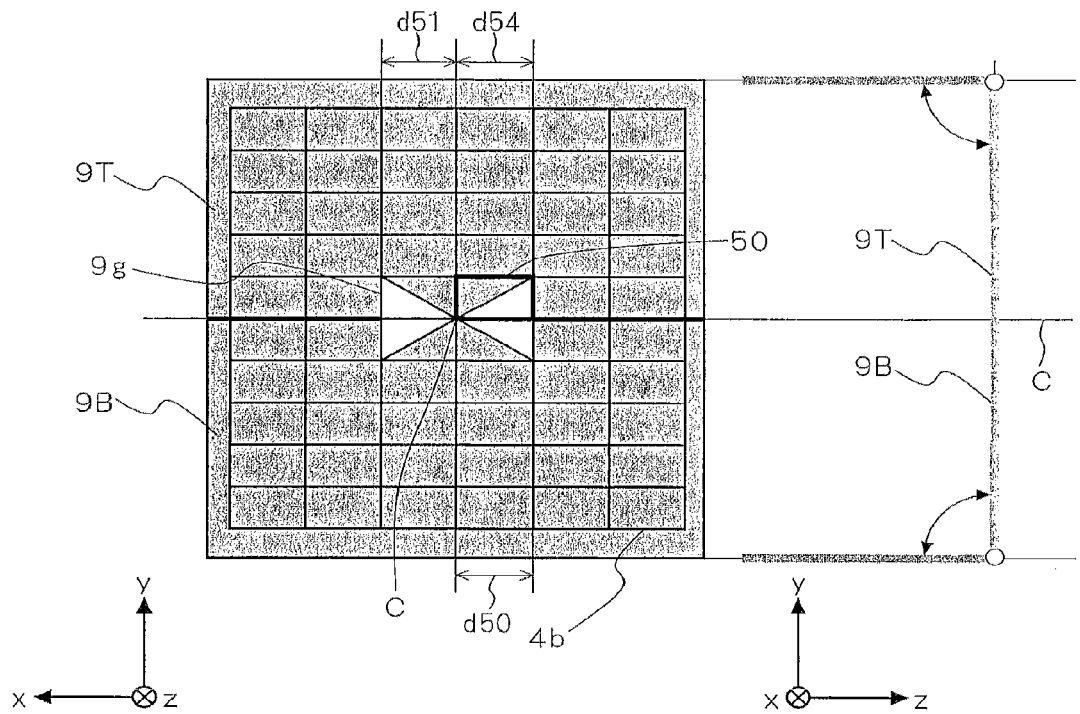
FIG. 5 is a view showing another example of the pivotal mechanism in the projection display apparatus according to the first preferred embodiment of the present invention.
Figure 6:
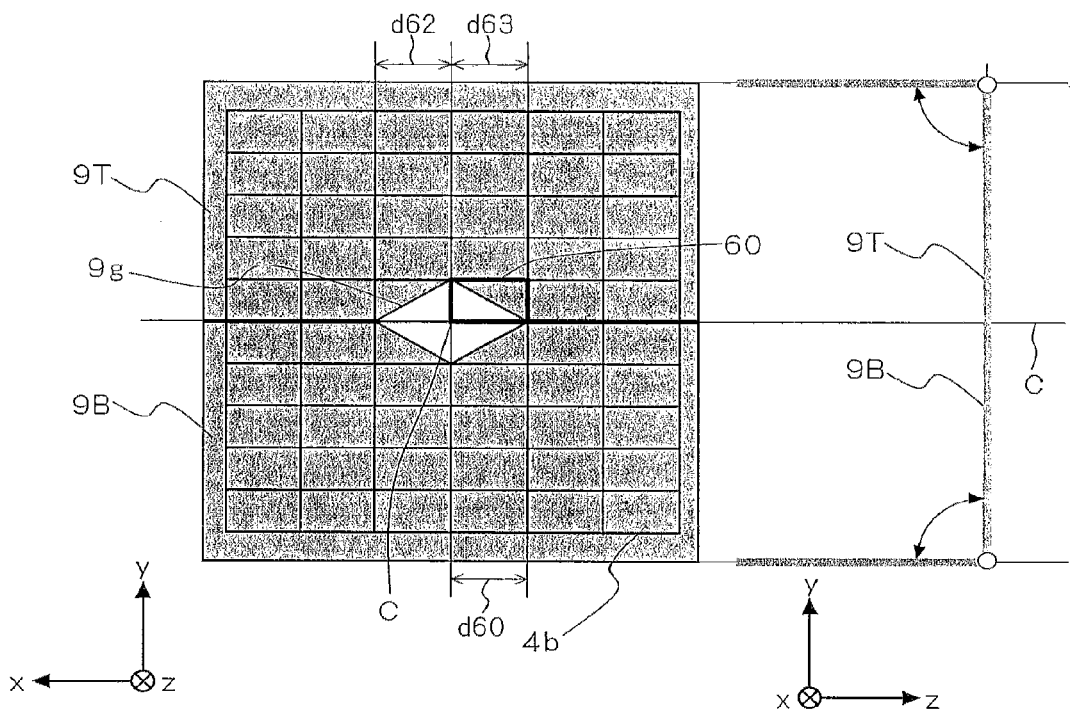
FIG. 6 is a view showing still another example of the pivotal mechanism in the projection display apparatus according to the first preferred embodiment of the present invention.

FIGS. 5 and 6 are views showing the configurations of the pivotal mechanism 9a including the light shielding elements 9T and 9B having the recessed portions 9g which are different in triangle vertex from that of FIG. 3. The configuration of the light shielding elements 9T and 9B of the pivotal mechanism 9a shown in FIG. 5 is such that a relationship between the length d50 of the long side of each of the lens cells 50 of the second lens array 4b which are in contact with the optical axis C and distances d51 and d54 is as follows: d51=d54=d50. The configuration of the light shielding elements 9T and 9B of the pivotal mechanism 9a shown in FIG. 6 is such that a relationship between the length d60 of the long side of each of the lens cells 60 of the second lens array 4b which are in contact with the optical axis C and distances d62 and d63 is as follows: d62=d63=d60. The use of such light shielding elements shown in FIGS. 5 and 6 also achieves the smooth adjustment of the amount of light, as indicated by the curve 41 of FIG. 4.

Figure 7:
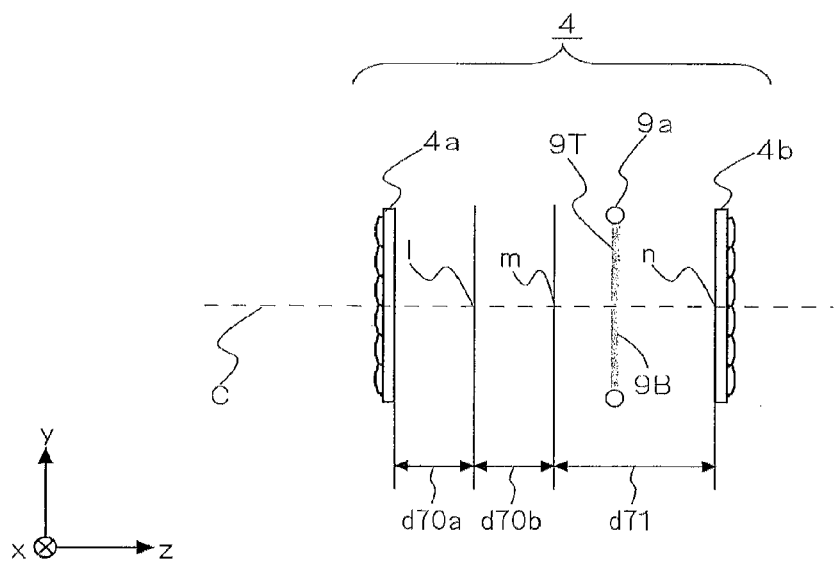
FIG. 7 is a view showing the location of light shielding elements in the projection display apparatus according to the first preferred embodiment of the present invention.

Next, a relationship between the configuration of the light shielding elements 9T and 9B of the pivotal mechanism 9a and an illuminance distribution on the light valve 2 will be described. FIG. 7 is a view showing the location of the light shielding elements 9T and 9B. In FIG. 7, d70a, d70b and d71 designate distances which satisfy d70a=d70b and 2×d70a=d71. FIGS. 9A to 9C show illuminance distributions on the light valve 2 corresponding to the configurations of the light shielding elements 9T and 9B shown in FIGS. 3, 5 and 6 when the light shielding elements 9T and 9B are closed for maximum light interception and are placed in a location 1 shown in FIG. 7. FIG. 9A shows the illuminance distribution obtained when the light shielding elements 9T and 9B are of the configuration shown in FIG. 3, and FIGS. 9B and 9C show the illuminance distributions obtained when the light shielding elements 9T and 9B are of the configurations shown in FIGS. 5 and 6, respectively. In FIGS. 9A to 9C, the illuminance distributions are shown with 256-level gray scale.

The location 1 lies between the light exiting surface of the first lens array 4a and a location m for the following reasons. The first lens array 4a and the light valve 2 are in conjugate relation to each other, and if the light shielding elements 9T and 9B are placed near the first lens array 4a, the configuration of the tip portions of the light shielding elements 9T and 9B is imaged on the light valve 2, which results in unevenness in illuminance. That is, the placement of the light shielding elements 9T and 9B near the light exiting surface of the first lens array 4a is not desirable because of the occurrence of the unevenness in illuminance. For such reasons, the location 1 is defined in a position closer to the second lens array 4b than the light exiting surface of the first lens array 4a.

The above-mentioned conjugate relation between the first lens array 4a and the light valve 2 will be discussed. FIG. 8 is a view conceptually showing ray trajectories when reverse ray tracing is carried out from the center of the light valve 2. The reference numeral 80 designates trajectories of light rays, and 81 designates a region containing the positions of the light rays which accomplish the formation of an image. From FIG. 8, it is found that the light rays near the first lens array 4a form an image on the light valve 2. In other words, it is found that the light valve 2 and the vicinity of the light incident surface of the first lens array 4a are in conjugate relation to each other as mentioned above.

With reference to FIG. 9A, it is found that the unevenness in illuminance is observed on the screen 11 because of the presence of a dark region 90. However, since the region 90 is small, the illuminance distribution shown in FIG. 9A is less uneven in illuminance than the illuminance distributions shown in FIGS. 9B and 9C obtained by the use of the light shielding elements 9T and 9B of FIGS. 5 and 6 to be described below. With reference to FIG. 9B, the unevenness in illuminance is observed on the screen 11 because of the presence of a region 91 that is dark and large. With reference to FIG. 9C, the unevenness in illuminance is observed on the screen because of the presence of a region 92 that is a linear bright region.

In consideration of the evenness of the illuminance distribution, it is therefore desirable that the configuration shown in FIG. 3 is used, i.e., that the triangle vertex is positioned in the middle of the long side of each lens cell 30 of the second lens array 4b (or that the triangle has a base which is a side of each lens cell 30 in contact with the x-axis and a vertex positioned in the middle of a side thereof opposed to the base) when the light shielding elements 9T and 9B of the pivotal mechanism 9a are placed in the location 1 shown in FIG. 7. Since the light valve 2 is in conjugate relation to the screen 11, an even illuminance distribution on the light valve 2 leads to an even illuminance distribution on the screen 11.

FIGS. 10A to 10C show illuminance distributions on the light valve 2 corresponding to the configurations of the light shielding elements 9T and 9B shown in FIGS. 3, 5 and 6 when the light shielding elements 9T and 9B are closed for maximum light interception and are placed in the location m shown in FIG. 7. In FIGS. 10A to 10C, the illuminance distributions are shown with 256-level gray scale. FIG. 10A shows the illuminance distribution obtained when the light shielding elements 9T and 9B are of the configuration shown in FIG. 3, and FIGS. 10B and 10C show the illuminance distributions obtained when the light shielding elements 9T and 9B are of the configurations shown in FIGS. 5 and 6, respectively.

With reference to FIG. 10A, it is found that the illuminance distribution is even. With reference to FIG. 10B, the unevenness in illuminance is observed on the screen 11 because of the presence of a region 101 that is dark and large. With reference to FIG. 10C, the unevenness in illuminance is observed on the screen 11 because of the presence of a region 102 that is not large but is dark.

It is therefore most desirable that the configuration shown in FIG. 3 is used, i.e., that the triangle vertex is positioned in the middle of the long side of each lens cell 30 of the second lens array 4b (or that the triangle has a base which is a side of each lens cell 30 in contact with the x-axis and a vertex positioned in the middle of a side thereof opposed to the base) when the light shielding elements 9T and 9B of the pivotal mechanism 9a are placed in the location m shown in FIG. 7.

FIGS. 11A to 11C show illuminance distributions on the light valve 2 corresponding to the configurations of the light shielding elements 9T and 9B shown in FIGS. 3, 5 and 6 when the light shielding elements 9T and 9B are closed for maximum light interception and are placed in a location n shown in FIG. 7. In FIGS. 11A to 11C, the illuminance distributions are shown with 256-level gray scale. FIG. 11A shows the illuminance distribution obtained when the light shielding elements 9T and 9B are of the configuration shown in FIG. 3, and FIGS. 11B and 11C show the illuminance distributions obtained when the light shielding elements 9T and 9B are of the configurations shown in FIGS. 5 and 6, respectively.

With reference to FIG. 11A to 11C, it is found that the illuminance distributions are even in all cases. In particular, the illuminance distribution on the light valve 2 shown in FIG. 11C exhibits a high degree of evenness. Thus, the unevenness in illuminance on the light valve 2 does not result independently of the position of the triangle vertex of the light shielding elements 9T and 9B when the light shielding elements 9T and 9B of the pivotal mechanism 9a are placed in the location n shown in FIG. 7.

Figure 12:
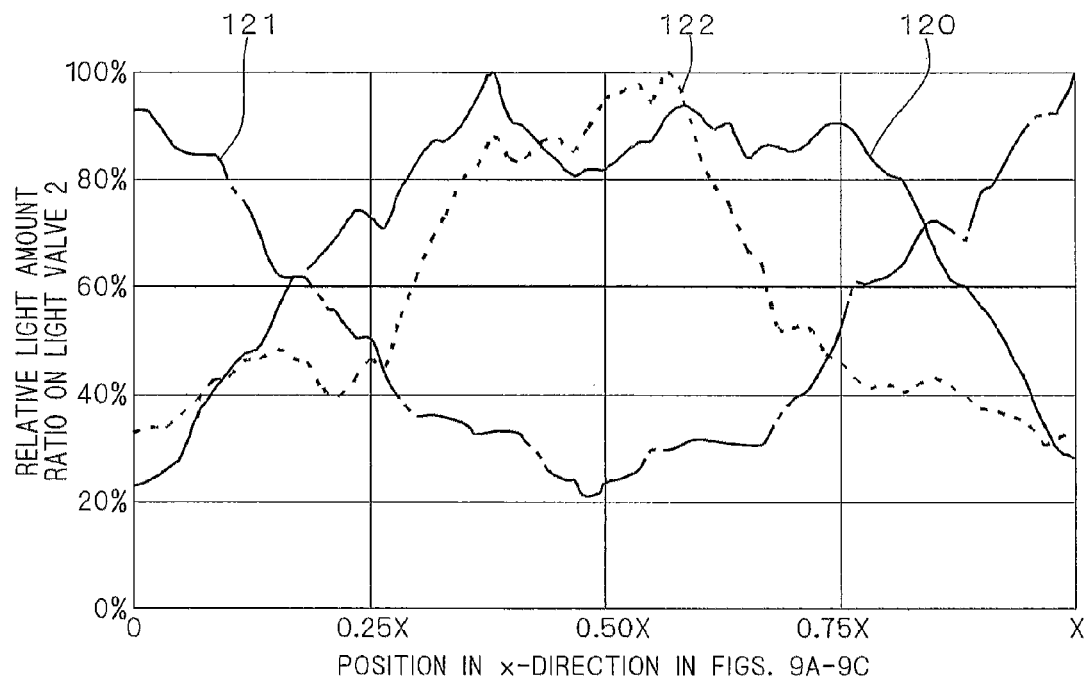
FIG. 12 is a graph showing the relative light amount ratio on the light valve when the light shielding elements in the projection display apparatus are as shown in FIGS. 9A to 9C according to the first preferred embodiment of the present invention.

Next, the tendency of the illuminance distribution on the light valve 2 will be recognized quantitatively. FIG. 12 is a graph showing the relative light amount ratio on the light valve 2 in the x-direction as obtained along lines 90a, 91b and 92c which are the x-axes shown in FIGS. 9A to 9C. The horizontal axis of FIG. 12 corresponds to the horizontal axis of the light valve 2 shown in FIGS. 9A to 9C. In FIG. 12, a curve 120 represents the relative light amount ratio along the line 90a, a curve 121 represents the relative light amount ratio along the line 91b, and a curve 122 represents the relative light amount ratio along the line 92c. In general, the relative light amount ratio of not less than 60% on the light valve 2 (0 to X) can be said to present no problem with the evenness in illuminance. With reference to FIG. 12, all of the curves 120, 121 and 122 show the relative light amount ratio of not greater than 60% on the light valve 2 (0 to X). It is found that the curve 120 exhibits the highest degree of evenness in FIG. 12.

Figure 13:
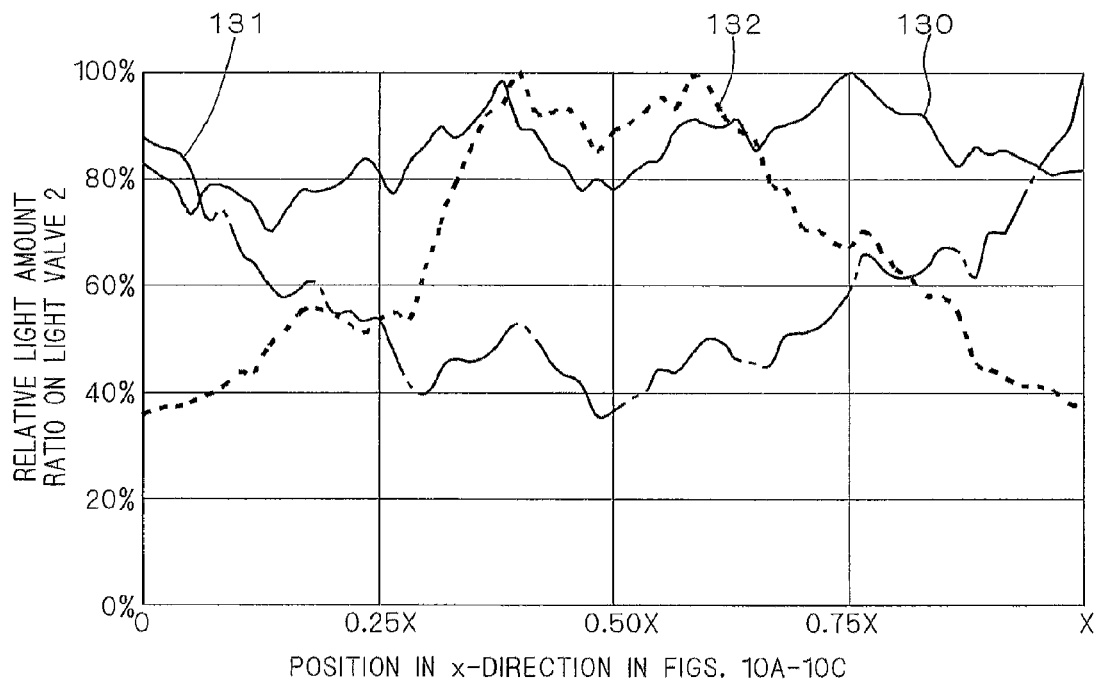
FIG. 13 is a graph showing the relative light amount ratio on the light valve when the light shielding elements in the projection display apparatus are as shown in FIGS. 10A to 10C according to the first preferred embodiment of the present invention.

FIG. 13 is a graph showing the relative light amount ratio on the light valve 2 in the x-direction as obtained along lines 100a, 101b and 102c which are the x-axes shown in FIGS. 10A to 10C. The horizontal axis of FIG. 13 corresponds to the horizontal axis of the light valve 2 shown in FIGS. 10A to 10C. In FIG. 13, a curve 130 represents the relative light amount ratio along the line 100a, a curve 131 represents the relative light amount ratio along the line 101b, and a curve 132 represents the relative light amount ratio along the line 102c. With reference to FIG. 13, only the curve 130 shows the relative light amount ratio of not less than 60%, and it is found that the curve 130 exhibits the even illuminance distribution on the light valve 2. For the curve 132, the relative light amount ratio is low in the positions indicated by "0" and "X" and slight unevenness in illuminance is observed on the screen 11. It is therefore most desirable that the configuration shown in FIG. 3 is used, i.e., that the triangle vertex is positioned in the middle of the long side of each lens cell 30 of the second lens array 4b (or that the triangle has a base which is a side of each lens cell 30 in contact with the x-axis and a vertex positioned in the middle of a side thereof opposed to the base) when the light shielding elements 9T and 9B of the pivotal mechanism 9a are placed in the location m shown in FIG. 7. In this case, the illuminance distribution is even on the screen 11.

Figure 14:
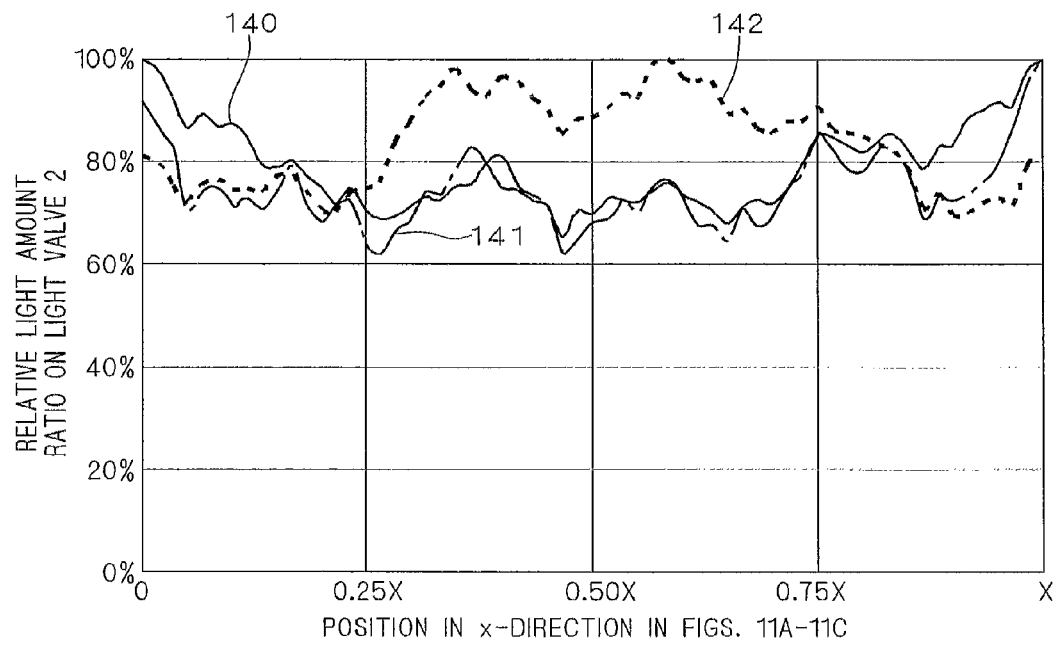
FIG. 14 is a graph showing the relative light amount ratio on the light valve when the light shielding elements in the projection display apparatus are as shown in FIGS. 11A to 11C according to the first preferred embodiment of the present invention.

FIG. 14 is a graph showing the relative light amount ratio on the light valve 2 in the x-direction as obtained along lines 110a, 111b and 112c which are the x-axes shown in FIGS. 11A to 11C. The horizontal axis of FIG. 14 corresponds to the horizontal axis of the light valve 2 shown in FIGS. 11A to 11C. In FIG. 14, a curve 140 represents the relative light amount ratio along the line 110a, a curve 141 represents the relative light amount ratio along the line 111b, and a curve 142 represents the relative light amount ratio along the line 112c. With reference to FIG. 14, all of the curves 140, 141 and 142 show the relative light amount ratio of not less than 60% on the light valve 2 (0 to X). The curve 142 shows the relative light amount ratio of approximately not less than 70%, and is considered to exhibit the highest degree of evenness. It is therefore most desirable that the configuration shown in FIG. 6 is used, i.e., that the triangle vertex is positioned closer to the optical axis C than the middle position of the long side of each lens cell 60 of the second lens array 4b (or that the triangle has a base which is a side of each lens cell 60 in contact with the x-axis and a vertex lying in a position where a side thereof opposed to the base is in contact with the y-axis) when the light shielding elements 9T and 9B of the pivotal mechanism 9a are placed in the location n shown in FIG. 7. In this case, the illuminance distribution is even on the screen 11.

To provide the evenness in illuminance distribution in the projection display apparatus, it is therefore desirable that the triangle vertex of the light shielding elements 9T and 9B is positioned in the middle of the long side of each lens cell 30, as shown in FIG. 3, when the light shielding elements 9T and 9B of the pivotal mechanism 9a are placed between the light exiting surface of the first lens array 4a and the light incident surface of the second lens array 4b (or placed in the location m shown in FIG. 7). It is also desirable that the triangle vertex of the light shielding elements 9T and 9B is positioned closer to the optical axis C than the middle position of the long side of each lens cell 60, as shown in FIG. 6, when the light shielding elements 9T and 9B of the pivotal mechanism 9a are placed closer to the light incident surface of the second lens array 4b than the light exiting surface of the first lens array 4a (or placed in the location n shown in FIG. 7).

Figure 15A:
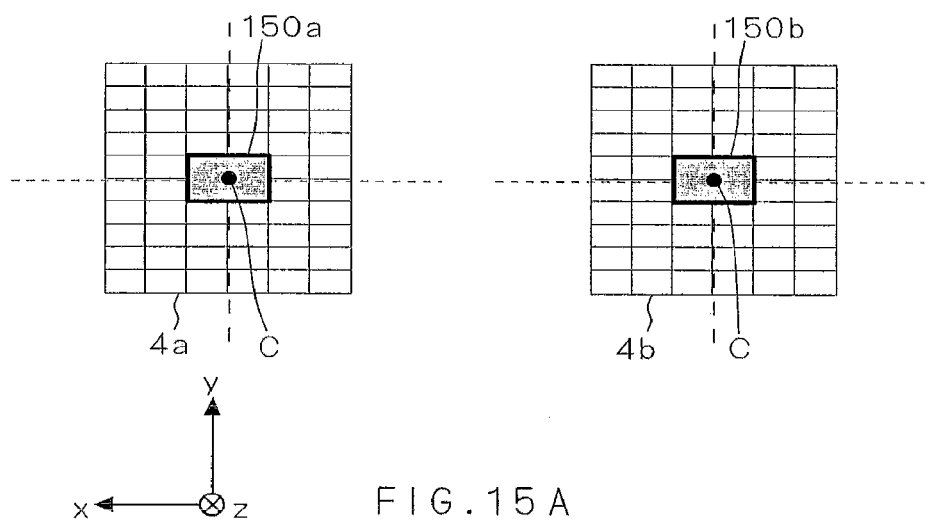
FIGS. 15A to 15C show an illuminance distribution at a light exiting surface of a first lens array and an illuminance distribution at a light incident surface of a second lens array.
Figure 15B:
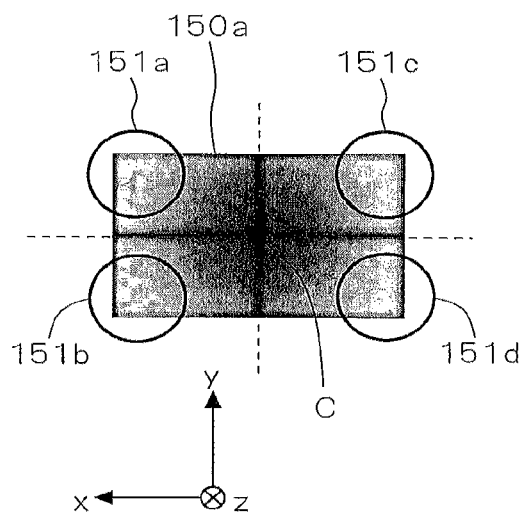
Figure 15C:
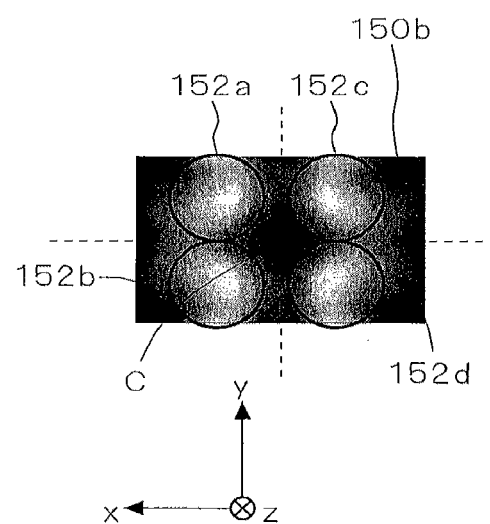

Next, a relationship between illuminance distributions at the first lens array 4a and the second lens array 4b will be described. FIGS. 15A to 15C show an illuminance distribution at the light exiting surface of the first lens array 4a and an illuminance distribution at the light incident surface of the second lens array 4b. In FIGS. 15B and 15C, the illuminance distributions are shown with 256-level gray scale. The illuminance distributions only in regions 150a and 150b in FIG. 15A are shown because the lens cells which are not in contact with the optical axis C are shielded from light by the light shielding elements 9T and 9B closed for maximum light interception. FIG. 15B shows the illuminance distribution at the light exiting surface of the first lens array 4a, and it is found that a region near the optical axis C is dark.

Figure 16:
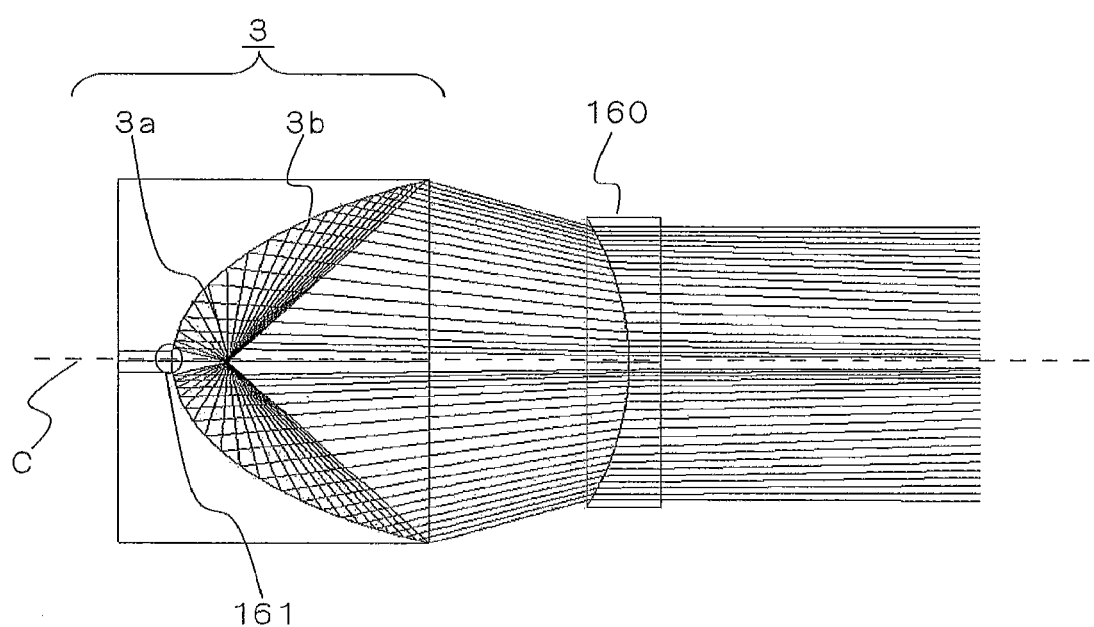
FIG. 16 is a view showing that light emitted from a light source is reflected from a reflecting mirror in simulation.

With reference to FIG. 16, a dark illuminance distribution is provided near the optical axis C in FIG. 15B because a recessed portion is in the form of an opening as indicated at 161. FIG. 16 is a view showing that light emitted from the light source 3a is reflected from the reflecting mirror 3b in simulation. The reflecting mirror 3b shall be of an ellipsoidal configuration, and a concave lens 160 makes the light emitted from the light source system 3 parallel. In general, there is a valve for the light source near the optical axis C. The reference numeral 161 indicates the recessed portion by means of the valve. The recessed portion prevents a portion just at the back thereof from serving as a reflecting mirror. For this reason, the amount of light near the optical axis C of the first lens array 4a is relatively low.

The light exiting from regions 151a, 151b, 151c and 151d shown in FIG. 15B is collected in regions 152a, 152b, 152c and 152d shown in FIG. 15C. It is hence found that light exiting from a position apart from the optical axis C of the first lens array 4a is collected near the optical axis C of the second lens array 4b.

For the even illuminance distribution on the light valve 2, it is hence necessary to avoid as practicably as possible shielding bright portions of the illuminance distributions shown in FIGS. 15A to 15C. Specifically, it is desirable that the triangle vertex of the light shielding elements 9T and 9B is positioned in the middle of the long side of each lens cell 30 (or that the triangle has a base which is a side of each lens cell 30 in contact with the x-axis and a vertex positioned in the middle of a side thereof opposed to the base), as shown in FIG. 3, when the light shielding elements 9T and 9B of the pivotal mechanism 9a are placed between the light exiting surface of the first lens array 4a and the light incident surface of the second lens array 4b (or placed in the location m shown in FIG. 7).

It is also desirable that the triangle vertex of the light shielding elements 9T and 9B is positioned closer to the optical axis C than the middle position of the long side of each lens cell 60 (or that the triangle has a base which is a side of each lens cell 60 in contact with the x-axis and a vertex lying in a position where a side thereof opposed to the base is in contact with the y-axis), as shown in FIG. 6, when the light shielding elements 9T and 9B of the pivotal mechanism 9a are placed closer to the light incident surface of the second lens array 4b than the light exiting surface of the first lens array 4a (or placed in the location n shown in FIG. 7).

It is considered to be desirable that the triangle vertex of the light shielding elements 9T and 9B is positioned farther from the optical axis C than the middle position of the long side of each lens cell 50 (or that the triangle has a base which a side of each lens cell 50 in contact with the x-axis and a vertex lying in a position opposite from the position where the side thereof opposed to the base is in contact with the y-axis), as shown in FIG. 5, when the light shielding elements 9T and 9B of the pivotal mechanism 9a are placed closer to the light exiting surface of the second lens array 4b than the light exiting surface of the first lens array 4a (or placed in the location 1 shown in FIG. 7).

Next, an illuminance distribution and a relative light amount ratio obtained when light shielding elements different in configuration from the above-mentioned light shielding elements shown in FIGS. 3, 5 and 6 will be described. FIGS. 17A and 17B show the illuminance distribution on the light valve 2 and the relative light amount ratio in the x-direction along a line 170 serving as the x-axis which are obtained when the vertex triangle of the light shielding elements 9T and 9B is positioned to satisfy d31=d34, d32=d33 and d31×3=d32 and when the light shielding elements 9T and 9B are placed in the location 1 shown in FIG. 7. The horizontal axis corresponds to the horizontal axis of the light valve 2 shown in FIG. 17A. The illuminance distribution is shown with 256-level gray scale.

From FIG. 17A, it is found that the illuminance distribution on the light valve 2 is even, as compared with FIGS. 9A, 9B and 9C. Although the relative light amount ratio in the x-direction is not greater than 60% in all cases in FIG. 12, it is found that a curve 171 shows the relative light amount ratio of not less than 60% in the range from 0 to X. It is therefore desirable that the triangle vertex of the light shielding elements 9T and 9B is positioned farther from the optical axis C than the middle position of the long side of each lens cell 50 (or that the triangle has a base which is a side of each lens cell 50 in contact with the x-axis and a vertex positioned farther from the optical axis than the middle of a side thereof opposed to the base), as shown in FIG. 5, when the light shielding elements 9T and 9B of the pivotal mechanism 9a are placed closer to the light exiting surface of the second lens array 4b than the light exiting surface of the first lens array 4a (or placed in the location 1 shown in FIG. 7). However, if the triangle vertex of the light shielding elements 9T and 9B is positioned too far from the middle position of the long side of each lens cell 50, the unevenness in illuminance results on the light valve 2.

Figure 18:
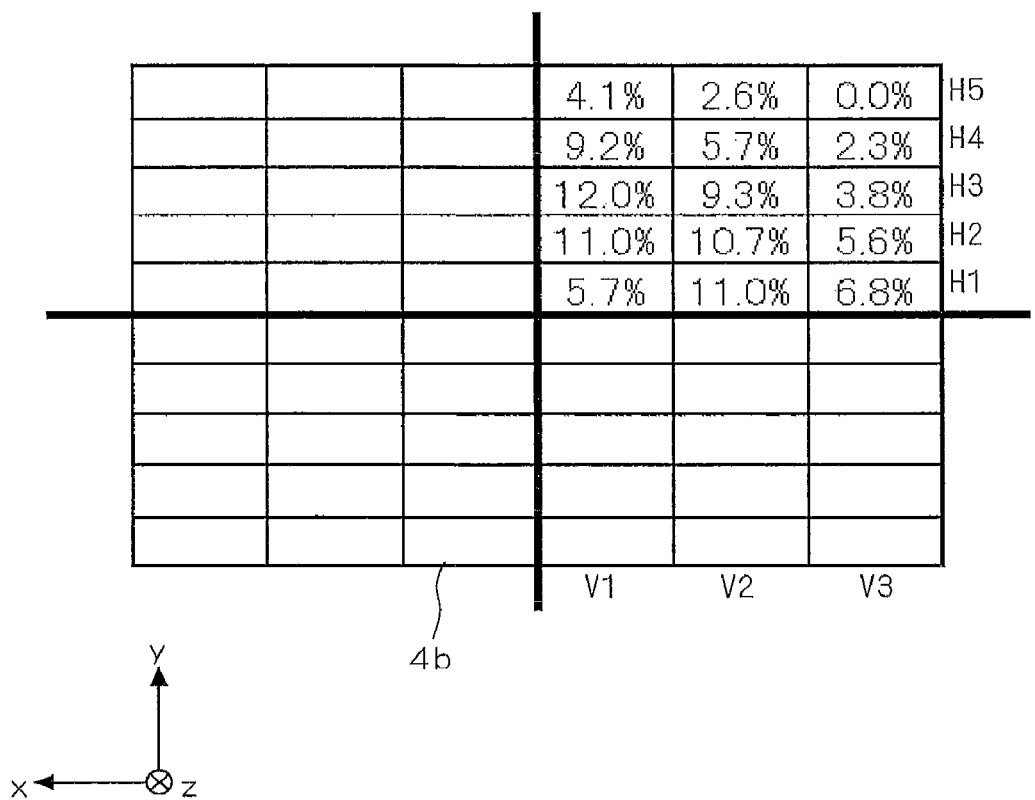
FIG. 18 shows the amounts of light passing through lens cells, respectively, of the second lens array in the projection display apparatus.

Next, the adjustment of the amount of light will be described. The amount of light reaching the light valve 2 during the maximum light interception (when the amount of light reaching the second lens array 4b is minimized) is reduced by bringing the recessed portions of the light shielding elements 9T and 9B of the pivotal mechanism 9a into correspondence with the lens cells of the second lens array 4b which are in contact with the optical axis C. FIG. 18 shows the amounts of light passing through the lens cells, respectively, of the second lens array 4b which are calculated in simulation so that the results of calculation are presented as numerical values in the respective lens cells. Since the second lens array 4b is symmetric with respect to both horizontal and vertical axes, the amounts of light are shown only in the first quadrant (the upper right quadrant) of the second lens array 4b as a typical representative. Also, the amounts of light in the entire first quadrant of the second lens array 4b are shown as normalized to sum into 100%.

From FIG. 18, it is found that the lens cell through which the lowest amount of light passes of all lens cells arranged in a row H1 is the lens cell in contact with the optical axis C and having coordinates {H1, V1}. To reduce the amount of light reaching the light valve 2 during the maximum light interception (when the amount of light reaching the second lens array 4b is minimized), it is therefore desirable that the lens cells in the row H1 except the lens cell having the coordinates {H1, V1} are shielded from light.

With reference again to FIG. 8, light rays exiting from the cells in a peripheral portion of the second lens array 4b enter the light valve 2 at a large incident angle. Because of the characteristics of the light valve 2, contrast decreases with the increase in the incident angle at which light enters the light valve 2. For this reason, it is desirable to prevent the decrease in contrast by forming an opening in a portion of the second lens array 4b where the incident angle is small. It is hence desirable to form an opening at the coordinates {H1, V1} where the incident angle is the smallest. Further, the formation of an opening at the coordinates {H1, V1} is desirable due to the fact that the amount of light at the coordinates {H1, V1} is the smallest as a result of comparison with the amounts of light at coordinates {H1, V2} and at coordinates {H1 and V3} in the row H1. The same holds true for the second, third and fourth quadrants.

Table 1 shows the relative light amount ratios of the light reaching the light valve 2 for the illuminance distributions shown in FIGS. 9A, 9B, 9C, 10A, 10B, 10C, 11A, 11B and 11C. It is assumed that the relative light amount ratio for the illuminance distribution shown in FIG. 9A is 100%.

TABLE 1

|  | FIG. 9A | FIG. 9B | FIG. 9C | FIG. 10A | FIG. 10B | FIG. 10C | FIG. 11A | FIG. 11B | FIG. 11C |
|---|---|---|---|---|---|---|---|---|---|
| Relative Light Amount Ratio | 100% | 66% | 56% | 115% | 53% | 67% | 98% | 46% | 96% |

From Table 1, it is found that the relative light amount ratio of the light reaching the light valve 2 is the smallest for the illuminance distribution shown in FIG. 11B. The unevenness in illuminance on the screen 11 is not observed from the illuminance distribution on the light valve 2 shown in FIG. 11B and from the curve 141 of FIG. 14. In other words, the best contrast and no illuminance unevenness on the screen 11 are observed by positioning the triangle vertex of the light shielding elements 9T and 9B farther from the optical axis C than the middle position of the long side of each lens cell 50 (or providing the triangle having a base which is a side of each lens cell 50 in contact with the x-axis and a vertex lying in a position opposite from the position where the side thereof opposed to the base is in contact with the y-axis), as shown in FIG. 5, when the light shielding elements 9T and 9B of the pivotal mechanism 9a are placed closer to the light incident surface of the second lens array 4b than the light exiting surface of the first lens array 4a (or placed between the locations m and n shown in FIG. 7). The reason for the placement between the locations m and n shown in FIG. 7 is that the relative light amount ratio is the second smallest in Table 1 for the illuminance distribution shown in FIG. 10B.

In the above description, the triangle vertex of the light shielding elements 9T and 9B is positioned in the middle and at the ends (closer to the optical axis C and opposite from the optical axis C) of each lens cell of the second lens array 4b. However, similar effects are produced when the triangle vertex of the light shielding elements 9T and 9B of the pivotal mechanism 9a is positioned between the middle and the ends of each lens cell of the second lens array 4b (or when the triangle has a base which is a side of each lens cell 50 in contact with the x-axis and a vertex lying in a position farther from the optical axis than the middle of a side thereof opposed to the base), as shown in FIG. 17.

Figure 19A:
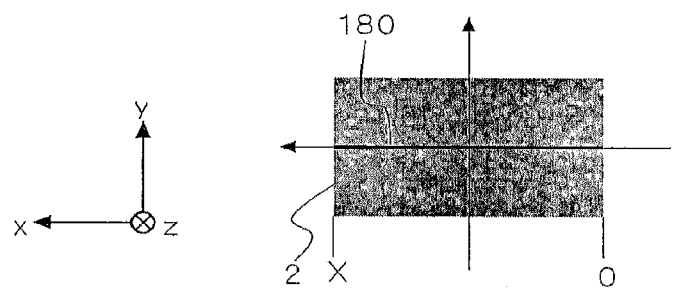
FIG. 19A and 19B show an illuminance distribution and a relative light amount ratio on the light valve in the projection display apparatus according to the first preferred embodiment of the present invention.
Figure 19B:
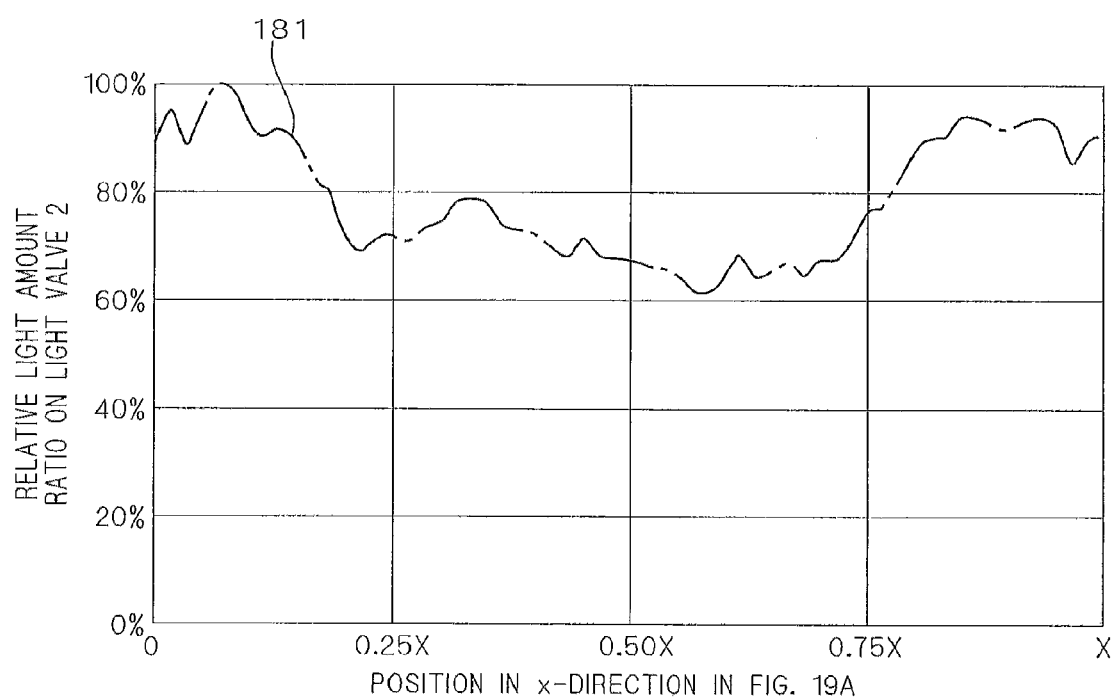

FIGS. 19A and 19B show the illuminance distribution on the light valve 2 and the relative light amount ratio in the x-direction along a line 180 serving as the x-axis which are obtained when the vertex triangle of the light shielding elements 9T and 9B is positioned to satisfy d31=d34, d32=d33 and d31×2=d32 and when the light shielding elements 9T and 9B are placed in the location m shown in FIG. 7. The illuminance distribution is shown with 256-level gray scale. It is found that a curve 181 shows the relative light amount ratio of not less than 60% in the range from 0 to X. In other words, the optimum position of the triangle vertex of the light shielding elements 9T and 9B for high contrast without the occurrence of the unevenness in illuminance on the screen 11 when the light shielding elements 9T and 9B are placed in the location m shown in FIG. 7 is such that d31=d34, d32=d33 and d31×2=d32.

To decrease the amount of light reaching the light valve 2 and to prevent the occurrence of the unevenness in illuminance on the screen 11, it is desirable that the light shielding elements 9T and 9B are placed between the locations m and n shown in FIG. 7 and the position s (the length of the normal line to the y-axis with reference to FIG. 3) of the triangle vertex of the light shielding elements 9T and 9B falls within the range expressed by $$2 \times d30/3 \leq s \leq d30 \quad (1)$$

Further, the optimum position s of the triangle vertex of the light shielding elements 9T and 9B relative to the position of the light shielding elements 9T and 9B is expressed by $$s=d32=d33=(2+(x-m)/(n-m)) \times d30/3 \quad (2)$$

where x is the position of the light shielding elements 9T and 9B (placed between the locations m and n with reference to FIG. 7), and s is the position of the triangle vertex of the light shielding elements 9T and 9B (the length of the normal line to the y-axis with reference to FIG. 3).

Thus, the triangular configuration of the light shielding elements 9T and 9B of the pivotal mechanism 9a allows the continuous adjustment of the amount of light and the achievement of high contrast without the occurrence of the unevenness in illuminance on the screen 11.

Further, the placement of the light shielding elements 9T and 9B of the pivotal mechanism 9a in a position closer to the light incident surface of the second lens array 4b than the light exiting surface of the first lens array 4a (between the locations m and n shown in FIG. 7) without the selection of the triangle vertex of the light shielding elements 9T and 9B of the pivotal mechanism 9a allows the continuous adjustment of the amount of light and the achievement of high contrast without the occurrence of the unevenness in illuminance on the screen 11.

Second Preferred Embodiment

Figure 20:
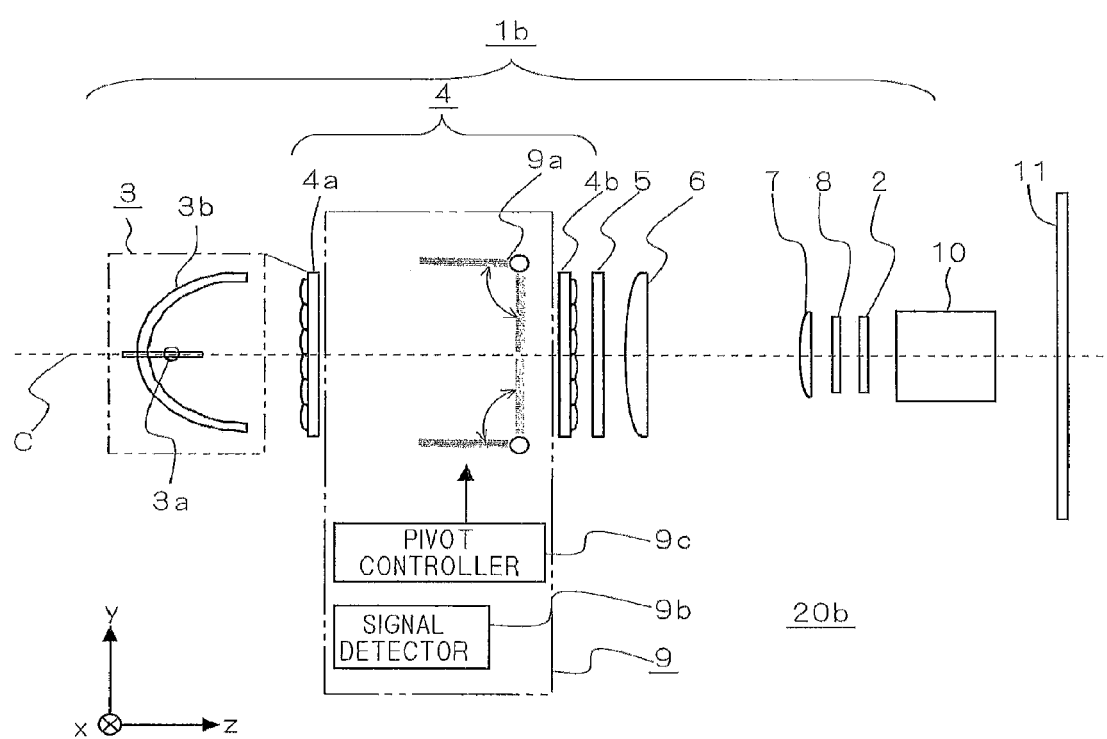
FIG. 20 is a view showing the construction of an illumination optical system in the projection display apparatus using the liquid crystal light valve according to a second preferred embodiment of the present invention.
Figure 21:
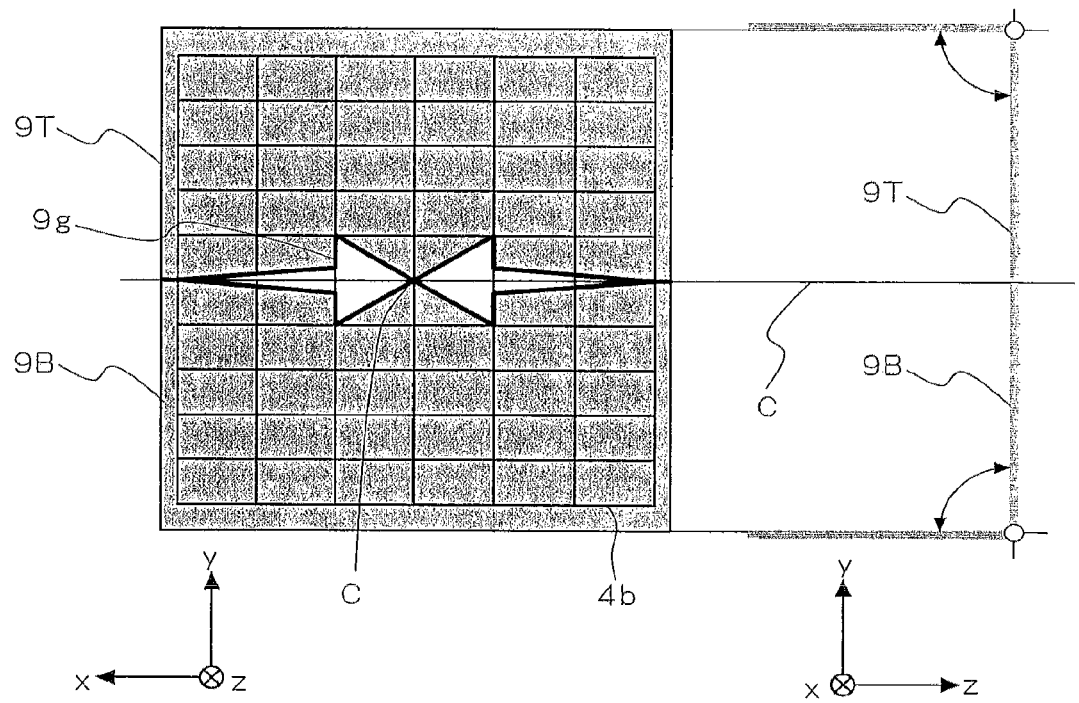
FIG. 21 is a view showing an example of the pivotal mechanism in the projection display apparatus according to the second preferred embodiment of the present invention.

FIG. 20 is a view showing the construction of an illumination optical system 1b in a projection display apparatus 20b using the liquid crystal light valve according to a second preferred embodiment of the present invention. The construction of the second preferred embodiment is similar to that of the first preferred embodiment, and will not be described for the sake of convenience. FIG. 21 is a view showing an example of the openings of the light shielding elements 9T and 9B of the pivotal mechanism 9a. The tip portions (opening contour lines) of the respective light shielding elements 9T and 9B of the pivotal mechanism 9a are configured not to have a portion parallel to the long side (the x-axis) of each lens cell of the second lens array 4b.

Figure 22:
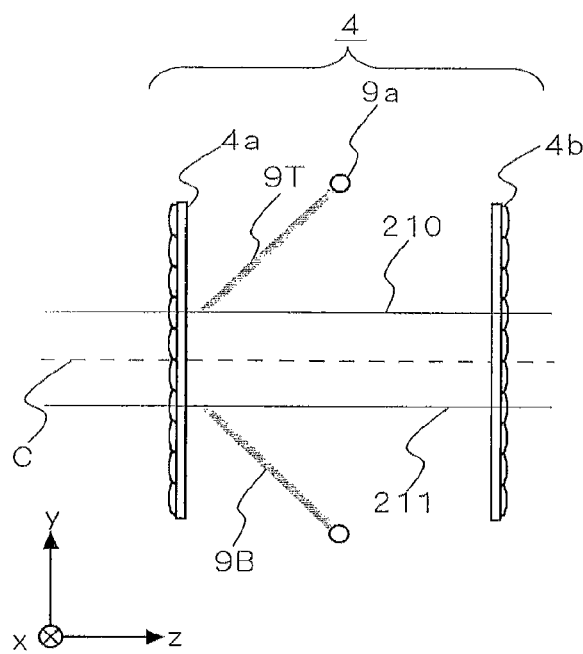
FIG. 22 is a view showing that tip portions of the light shielding elements of the pivotal mechanism are disposed near the first lens array.
Figure 23:
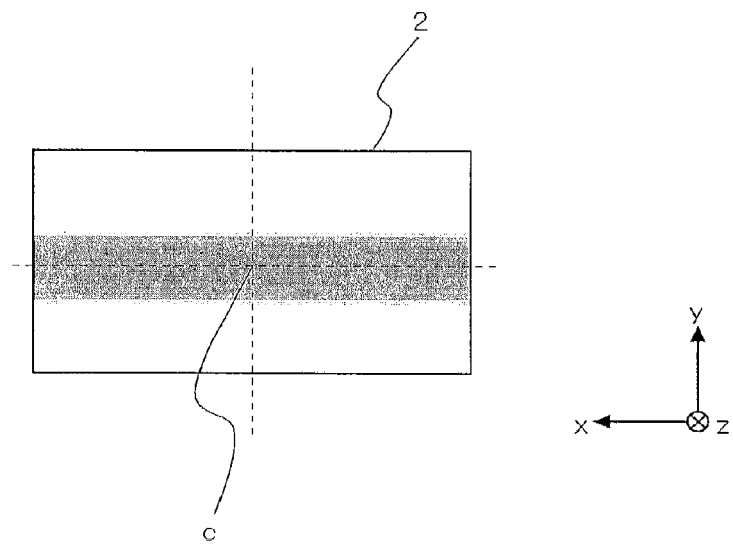
FIG. 23 shows an example of color irregularities along a line which occur when the light shielding elements of the pivotal mechanism are as shown in FIG. 21.

FIG. 22 is a view showing that the tip portions of the light shielding elements 9T and 9B of the pivotal mechanism 9a are disposed in a position where color irregularities are prone to result along a line on the light valve 2. With reference to FIG. 8, the light incident surface of the first lens array 4a is in conjugate relation to the light valve 2. Thus, when a small amount of light passes through the second lens array 4b (for example, as shown in FIG. 22), there arise color irregularities along the line on the light valve 2 in some cases (with reference to FIG. 23). Specifically, when the tip portions of the light shielding elements 9T and 9B of the pivotal mechanism 9a are positioned at the center of curvature in the y-direction of the lens cells in the row H2 of the second lens array 4b, the tip portions having more parts parallel to the long side of each lens cell are more prone to cause color irregularities along the line on the light valve 2. FIG. 23 shows, with 256-level gray scale, an example of color irregularities along the line which occur on the light valve 2 when the tip portions of the light shielding elements 9T and 9B of the pivotal mechanism 9a are positioned at the center of curvature in the y-direction of the lens cells in the row H2 of the second lens array 4b as shown in FIG. 22 without the recessed portions in the tip portions of the light shielding elements 9T and 9B and when the tip portions are parallel to the long side of each lens cell.

Figure 24:
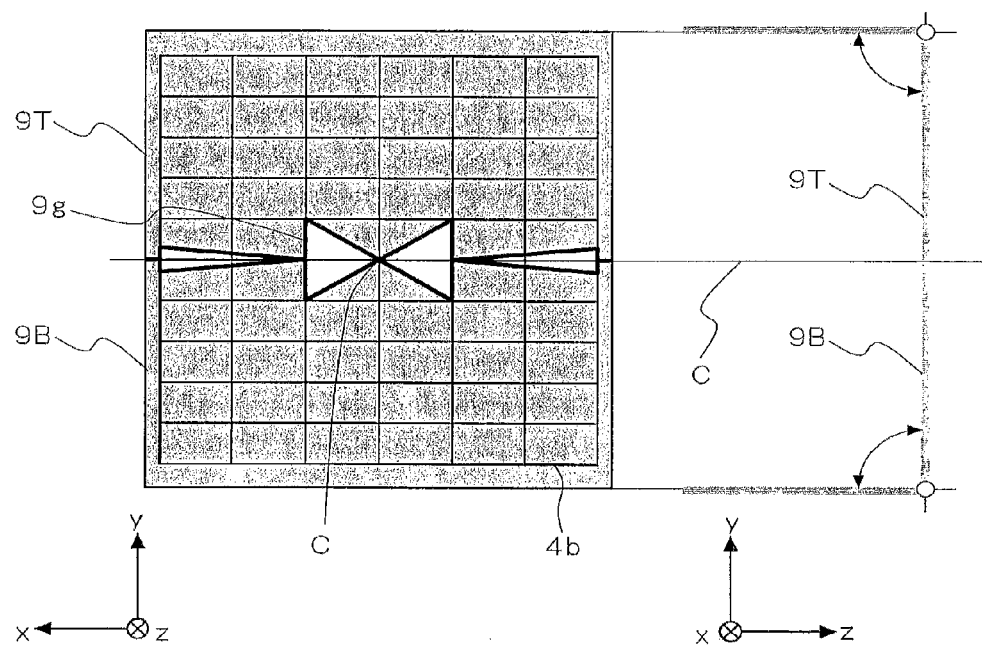
FIG. 24 is a view showing another example of the pivotal mechanism in the projection display apparatus according to the second preferred embodiment of the present invention.

The formation of the tip portions of the light shielding elements 9T and 9B of the pivotal mechanism 9a as shown in FIG. 21 makes the color irregularities along the line less prone to occur on the light valve 2. Further, the increase in the area of light shielding regions with distance from the optical axis C minimizes the decrease in contrast under the influence of the light incident characteristics of the light valve 2. Thus, as shown in FIG. 24, avoiding the configuration of the tip portions of the light shielding elements 9T and 9B of the pivotal mechanism 9a which allows an increasing amount of light to pass therethrough with distance from the optical axis C prevents the color irregularities along the line on the light valve 2 and minimizes the decrease in contrast.

In the first preferred embodiment, there is a likelihood that color irregularities along the line are observed on the screen 11 when the tip portions of the light shielding elements 9T and 9B of the pivotal mechanism 9a are configured as shown in FIG. 5 and when the tip portions of the light shielding elements 9T and 9B are positioned as shown in FIG. 22. It is hence desirable that the tip portions of the light shielding elements 9T and 9B are controlled so as not to be positioned at the center of curvature in the y-direction of the second lens array 4b.

In the first preferred embodiment, there is a likelihood that color irregularities along the line are observed on the screen 11 when the tip portions of the light shielding elements 9T and 9B of the pivotal mechanism 9a are configured as shown in FIG. 5. In this case, the provision of the tip portions of the light shielding elements 9T and 9B of the pivotal mechanism 9a configured not to have a portion parallel to the long side of each lens cell of the second lens array 4b as illustrated in the second preferred embodiment eliminates the need to control the position of the tip portions of the light shielding elements 9T and 9B in a manner described above to thereby achieve the wider range of control.

While the invention has been described in detail, the foregoing description is in all aspects illustrative and not restrictive. It is understood that numerous other modifications and variations can be devised without departing from the scope of the invention.

What is claimed is:

1. A projection display apparatus comprising:
    a light valve;
    a light source for producing light directed to said light valve;
    an integrator lens disposed in an optical path extending from said light source to said light valve and including a first lens array and a second lens array both for rendering even an illuminance distribution of light directed from said light source; and
    a light amount adjustment mechanism disposed in the optical path between said first lens array and said second lens array and for adjusting the amount of light directed to said light valve, said light amount adjusting mechanism including a pair of light shielding elements pivoting in the form of a pair of double doors, said pair of light shielding elements having an opening formed in a region of tip portions thereof which corresponds to lens cells in contact with the optical axis of said second lens array,
    wherein a region of said opening corresponding to one lens cell in contact with the optical axis of said second lens array is of a triangular configuration, wherein
    said triangular configuration of the opening of said pair of light shielding elements has a base which is a side of said lens cell of said second lens array in contact with an x-axis and a vertex positioned farther from the optical axis than the middle of a side of said lens cell opposed to said base, when said pair of light shielding elements are placed between a first position and a second position, said first position being the position of a light incident surface of said second lens array, said second position being an intermediate position between a light exiting surface of said first lens array and the light incident surface of said second lens array, said x-axis being a long axis of said lens cell and perpendicular to said optical axis.

2. The projection display apparatus according to claim 1, wherein
    satisfied is a relationship expressed by $$2 \times d30/3 \leq s \leq d30$$

where d30 is the length of the long axis of said lens cell of said second lens array, and s is the length of a normal line extending from the vertex of the triangular configuration of the opening of said pair of light shielding elements to a y-axis, said y-axis being a short axis of said lens cell and perpendicular to said optical axis.

3. The projection display apparatus according to claim 1, wherein
    said opening includes a region corresponding to a cell other than the lens cells in contact with the optical axis of said second lens array, and
    said opening of said pair of light shielding elements has a contour line configured not to be parallel to an x-axis, said x-axis being a long axis of said lens cell and perpendicular to said optical axis.

4. The projection display apparatus according to claim 3, wherein
    the contour line of said opening of said pair of light shielding elements has a triangular configuration, and
    the length of a normal line extending between the tip portions of said light shielding elements and said x-axis decreases with distance from a y-axis with respect to the vertex of said triangular configuration, said y-axis being a short axis of said lens cell and perpendicular to said optical axis.

\* \* \* \* \*